United States Patent [19]
Lai

[11] Patent Number: 6,118,813
[45] Date of Patent: Sep. 12, 2000

[54] TECHNIQUE FOR EFFECTIVELY TREATING ROBBED BIT SIGNALING IN DATA COMMUNCATIONS

[75] Inventor: Yhean-Sen Lai, Warren, N.J.

[73] Assignee: Lucent Technologies Inc., Murray Hill, N.J.

[21] Appl. No.: 08/962,516

[22] Filed: Oct. 31, 1997

[51] Int. Cl.[7] .............................. H03H 7/30; H04B 14/04; H04J 3/12
[52] U.S. Cl. .......................... 375/231; 375/242; 320/523
[58] Field of Search .................................... 375/231, 229, 375/233, 241, 242–243, 254, 316; 370/523

[56] References Cited

U.S. PATENT DOCUMENTS

| | | | |
|---|---|---|---|
| 5,694,424 | 12/1997 | Ariyavisitakul | 375/233 |
| 5,729,226 | 3/1998 | Betts et al. | 341/94 |
| 5,732,112 | 3/1998 | Langbert | 375/349 |
| 5,859,872 | 1/1999 | Townshend | 375/242 |

*Primary Examiner*—Chi H. Pham
*Assistant Examiner*—Khai Tran
*Attorney, Agent, or Firm*—Alex L. Yip

[57] ABSTRACT

In a communications arrangement, a first pulse code modulation (PCM) modem communicates data in the form of PCM words with a second PCM modem through a public switched telephone network (PSTN). The transmitted data may be affected by robbed bit signaling imposed by the PSTN such that the least significant bits (LSBs) of certain PCM words are "robbed" and substituted with signaling bits. In accordance with the invention, any imposed robbed bit signaling is detected during training of the second PCM modem. The would-be PCM words affected by such robbed bit signaling are identified to the first PCM modem. The latter then avoids transmitting data using the LSBs of those PCM words. In addition, through the training, a decision feed-back equalizer in the second PCM modem is properly adjusted, taking into account any robbed bit signaling affecting the transmitted training data.

27 Claims, 2 Drawing Sheets

TECHNIQUE FOR EFFECTIVELY TREATING ROBBED BIT SIGNALING IN DATA COMMUNCATIONS

FIELD OF THE INVENTION

The invention relates to communications systems and methods, and more particularly to a communications system and method in which robbed bit signaling is detected and treated in data communications.

BACKGROUND OF THE INVENTION

It is well known that a public switched telephone network (PSTN) comprising T1 facilities can form a basis for a virtual digital network providing 64 kb/s channels. For example, by synchronizing a pulse code modulation (PCM) modem to an 8 kHz sampling rate provided in a central office and using 8-bit PCM words for data transmission, the modem can theoretically achieve a data rate up to 64 kb/s.

However, in practice, due to power constraints and such channel impairments as echo and intersymbol interference, the highest data rate achievable by the PCM modem is about 56 kb/s. This rate may be further reduced as the central office periodically "robs" the least significant bit (LSB) of the PCM words and substitutes it with a signaling bit. As is well known, the robbed bit signaling is necessary for indicating call statuses to effect call administration in the PSTN. While the robbed bit substitution does not cause significant distortion in voice communications, it causes significant degradation in the data communications because of the loss of transmitted bits occasioned thereby. In addition, the robbed bit substitution undermines proper training of an equalizer in the PCM modem, thereby adversely affecting channel equalization for the data communications.

Accordingly, there exists a need for effectively detecting the robbed bit signaling to avoid transmitting data in the robbed bit positions, and to take into account the robbed bit substitution to properly train the equalizer.

SUMMARY OF THE INVENTION

In accordance with the invention, during training of an equalizer in a first PCM modem, robbed bit signaling affecting training data received from a second PCM modem is detected. The same training data is generated in a receiver in the first modem and is modified based on the detected robbed bit signaling. The equalizer is adjusted based on at least the modified training data. In addition, in detecting the robbed bit signaling, the training data is grouped according to periodicity of the robbed bit signaling. One or more groups in which data is affected by the robbed bit signaling are identified. The identities of these groups are communicated back to the second modem to avoid losing information in transmission of subsequent data belonging to such groups.

DETAILED DESCRIPTION

Figure 1:
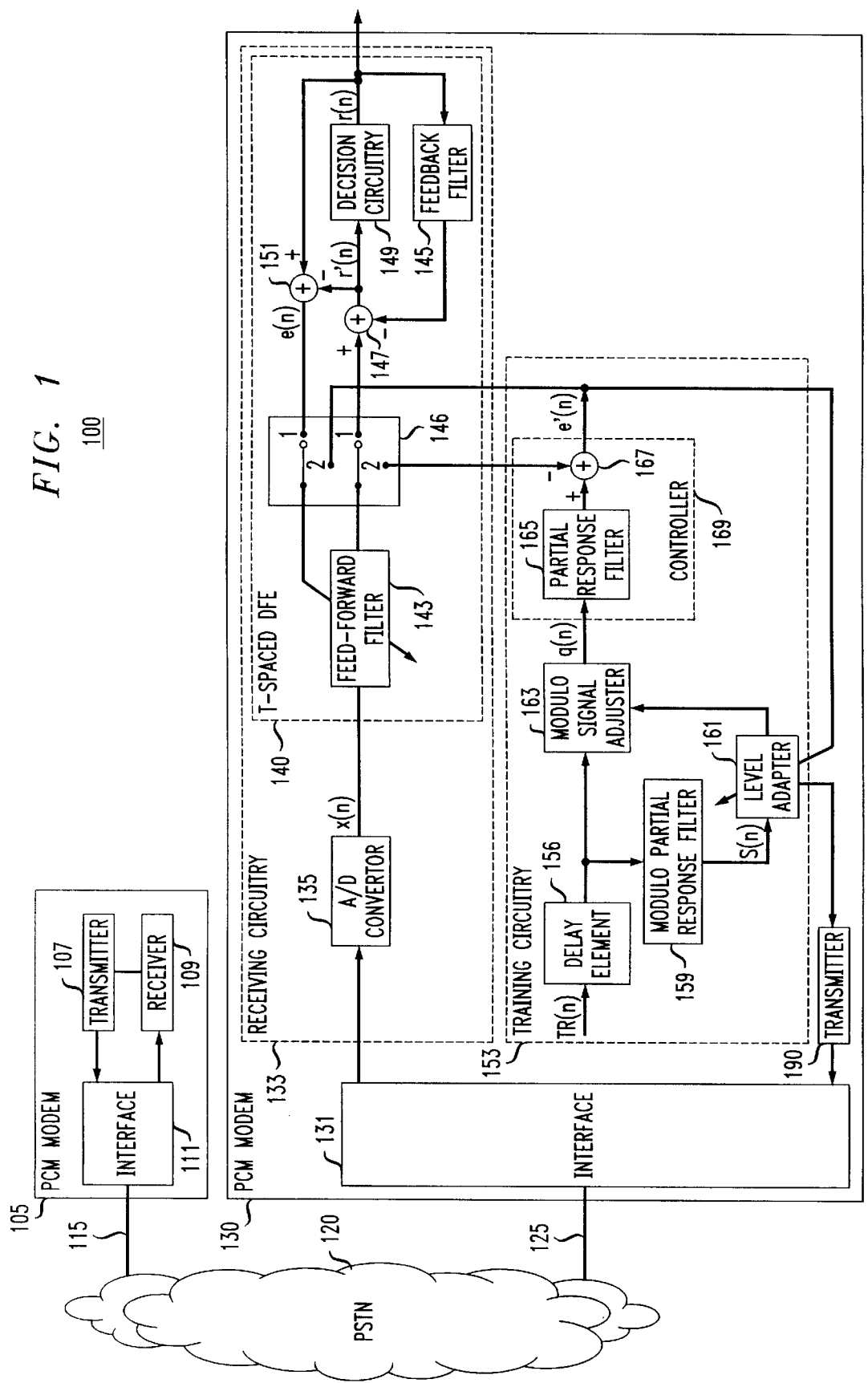
FIG. 1 illustrates communications arrangement in accordance with the invention.

FIG. 1 illustrates communications arrangement 100 embodying the principles of the invention. In arrangement 100, pulse code modulation (PCM) modem 105 at a central site is connected to public switched telephone network (PSTN) 120 via T1 line 115. Modem 105 may be employed by, say, an Internet service provider, to communicate data from the Internet to PCM modem 130 at a client site. Modem 130 may initiate a dial-up connection to modem 105 to access the Internet service. This dial-up connection includes analog loop 125 connecting modem 130 to PSTN 120.

In this instance, both modems are synchronized to an 8 kHz sampling rate provided by a conventional $\mu$-law codec in a central office (not shown) in PSTN 120. The data communications between modems 105 and 130 are in the form of 8-bit PCM words, using the non-uniformly spaced quantization levels in accordance with the standard $\mu$-law companding as the signal alphabets or data symbols. Theoretically, the highest realizable rate of such data communications is 64 kb/s. However, in practice, due to power constraints and such channel impairments as echo and intersymbol interference, the highest data rate achievable here is about 56 kb/s.

In PCM modem 105, transmitter 107 illustratively transmits Internet data through standard interface ill to PCM modem 130 via an established dial-up connection. The spectrum of a transmitted signal, x(t) at time t, representing the Internet data spans from DC to 4 kHz over analog loop 125. The transmitted signal, however, is corrupted by the channel impairments including intersymbol interference. The transmitted signal is received by standard interface 131. The received signal is then applied to A/D convertor 135 of conventional design in receiving circuitry 133. The resulting digital samples, denoted x(n), are illustratively processed by adaptive T-spaced decision feedback equalizer (DFE) 140 of conventional design, where n=t/T and T represents the symbol interval. However, it will be appreciated that a person skilled in the art will employ, instead of DFE 140 here, an adaptive fractionally-spaced (e.g., T/2-spaced) DFE. In a well known manner, DFE 140 decides what PCM words were transmitted based on the digital samples, and uses past decisions to compensate for the undesirable intersymbol interference.

Specifically, DFE 140 includes feed-forward filter 143 and feedback filter 145, which may be finite impulse response (FIR) filters. Let N and K be the numbers of tap coefficients of filters 143 and 145, respectively, and $c_u$'s and $p_v$'s represent the coefficients of the respective filters, where $0 \leq u < N$ and $0 \leq v < K$. The coefficients $P_v$'s are pre-selected to achieve an impulse response of an equivalent channel based on the real channel conditions.

It should be noted at this point that modem 130 operates in two modes, namely, a training mode and an operation mode. When modem 130 is initialized, the training mode, described below, is selected using switch 146. Otherwise, in the operation mode, which is the current mode, switch 146 is set at a first position to pass the output of feed-forward filter 143 to subtracter 147. This subtracter subtracts, from the received output, the output of feedback filter 145. The resulting difference, denoted r' (n), is provided to decision circuitry 149. The latter determines what the most likely transmitted PCM words are, which are denoted r(n). The decisions from circuitry 149 are provided as an input to feedback filter 145, and are also provided as an input to subtracter 151. Using r' (n) as another input, subtracter 151 evaluates an error signal e(n) as follows:

$$e(n) = r(n) - r'(n) = r(n) - [P^T(n)R(n) - C^T(n)X(n)],$$

where P(n), R(n), C(n) and X(n) are vectors, the superscript "T" denotes a standard vector transposition operation, $P^T(n) = [p_{K-1}(n) \ p_{K-2}(n) \ldots p_1(n) \ p_0(n)]$, with $p_0(n)=1$, $R^T(n) = [r(n-(K-1)) \ r(n-(K-2)) \ldots r(n-1) \ r(n)]$, $C^T(n) = [c_{N-1}(n) \ c_{N-2}(n) \ldots c_1(n) \ c_0(n)]$, and $X^T(n) = [x(n-(N-1)) \ x(n-(N-2)) \ldots x(n-1) \ x(n)]$.

In the current operation mode, the error signal e(n) is passed, through switch 146, onto feed-forward filter 143 to update its tap coefficients according to the following expression:

$$C(n+1) = C(n) + 2\alpha e(n) \ X(n),$$

where $\alpha$ represents a predetermined step-size of the update.

Figure 2:
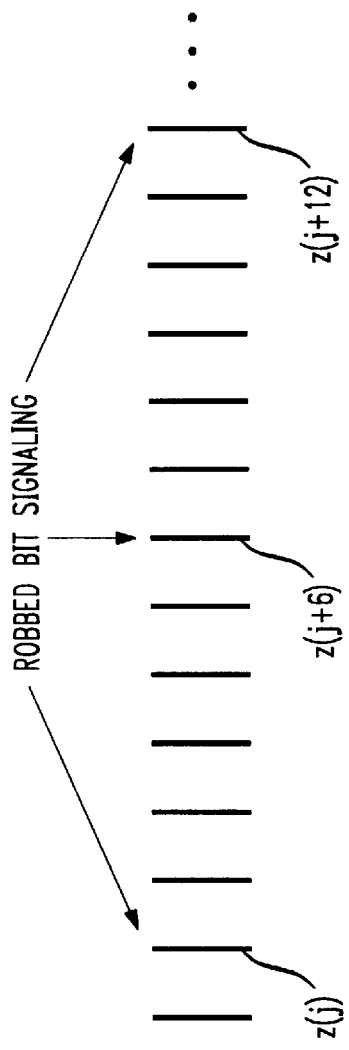
FIG. 2 illustrates periodicity of robbed bit signaling affecting data symbols transmitted by a PCM modem in the arrangement of FIG. 1.

Like a conventional PSTN, PSTN 120 implements robbed bit signaling to indicate call statuses to effect call administration therein. In robbed bit signaling, the central office in PSTN 120 robs the LSB of a transmitted symbol on each T1 channel once in every six frames. Thus, referring to FIG. 2, if the robbed bit signaling affects an $j^{th}$ PCM word (denoted z(j)) transmitted by modem 105 on a channel of T1 line 115, it equally affects every $(j+6k)^{th}$ PCM word transmitted thereby, where k is an integer. As each affected PCM word has its LSB substituted by a signaling bit, the loss of the LSB data causes significant degradation to the data transmission. In addition, the robbed bit substitution undermines proper training of DFE 140, thereby adversely affecting the channel equalization in data recovery.

Two types of robbed bit signaling have been identified. A first one herein is referred to as "Type A" robbed bit signaling, and the other herein is referred to as "Type B" robbed bit signaling. In the type A robbed bit signaling, the LSB of the transmitted PCM word is always set to a binary value "1". For example, when modem 105 is used to communicate data represented by a PCM word "4F" (in hexadecimal) to modem 130, transmitter 107 transmits onto line 115 its $\mu$-law value, "B0," which is the complement of "4F" in accordance with the $\mu$-law companding technique. Implementing the type A robbed bit signaling, an intermediate central office in PSTN 120 transforms the transmitted word "B0" to "B1." The transformed word would be converted by a $\mu$-law codec in a central office close to modem 130 to an analog signal with a signal level of 943 units. Assuming no channel imperfection, A/D converter 135 in modem 130 would convert the analog signal to a digital representation of "4E," which is the complement of "B1." Thus, because of the type A robbed bit signaling, the PCM word "4F" communicated by modem 105 becomes "4E" when received at modem 130. However, it should be noted that the type A robbed bit signaling has no effect on communicated words whose LSB's="0", e.g., "4E."

On the other hand, when a transmitted PCM word affected by the type B robbed bit signaling is converted to an analog signal on analog loop 125, the signal level takes on an average value between that representing the PCM word having the LSB="1" and that representing the PCM word having the LSB="0." For example, when either the PCM word "4E" corresponding to an analog signal level of 943 units or "4F" corresponding to an analog signal level of 975 units is communicated by modem 105, the level of the analog signal received by A/D converter 135 in modem 130 is indiscriminately 959 units approximately, which is the average between 943 units and 975 units. Thus, regardless of whether the communicated word is "4E" or "4F," assuming no channel imperfection, A/D converter 135 would covert it to "4E" about half the times and "4F" the other half.

In accordance with the invention, during the training of modem 130, whether any type A and/or type B robbed bit signaling affecting the data transmission from modem 105 to modem 130 is identified. Depending on the type(s) of the identified robbed bit signaling, feed-forward filter 143 in DFE 140 is accordingly adjusted to provide proper channel equalization. In addition, the identities of would-be PCM words affected by either type of robbed bit signaling are communicated to modem 105. The latter then avoids transmitting data in the LSBs of those PCM words.

In this illustrative embodiment, the reference signals used to train modem 130 include non-spectrum shaping signals known as the "TRN1A" signals. In a well known manner, the TRN1A signals are generated by first scrambling binary bits "1." Each bit $b_n$ in the scrambled bit sequence determines the sign of a TRN1A signal represented by $b_{n-24}$. Specifically, if $b_{n-24}=1$, a signal having a signal level $a_0=975$ units, representative of "4F," is generated. Otherwise if $b_{n-24}=0$, a signal having a signal level $a_0'=943$ units, representative of "4E," is generated.

Figure 3:
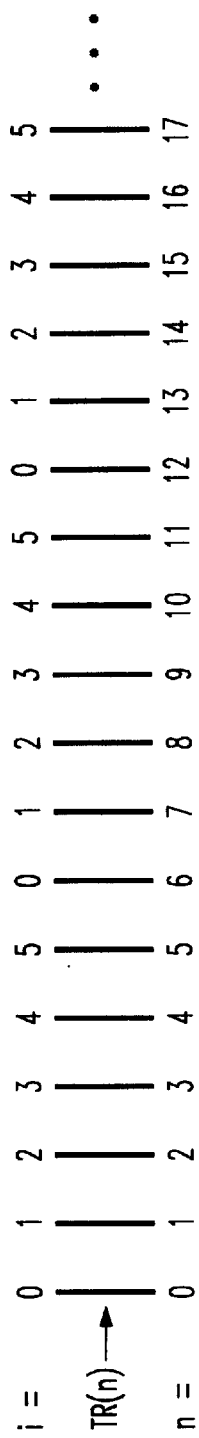
FIG. 3 illustrates grouping of symbols according to the periodicity.

In the training mode, modem 130 has switch 146 set at a second position. Modem 105 transmits data based on the same sequence of TRN1A signals, denoted TR(n), used to train feed-forward filter 143. It should be noted that if the robbed bit signaling, whether of type A or type B, affects a first TRN1A signal in the sequence, every $6^{th}$ signal from that first signal in the sequence would be equally affected. Referring to FIG. 3, to effectively identify any affected signals, the sequence of TRN1A signals are divided into six groups, i.e., groups i=0, 1, . . . 5. In this instance, group 0={TR(0) TR(6) TR(12) . . . }, group 1={TR(1) TR(7) TR(13) . . . }, group 2={TR(2) TR(8) TR(14) . . . , group 3={TR(3) TR(9) TR(15) . . . }, group 4={TR(4) TR(10) TR(16) . . . }, and group 5={TR(5) TR(11) TR(17) . . . }. If any member of one such group is affected by robbed bit signaling, all members in that group are equally affected.

Referring back to FIG. 1, a local training sequence TR(n) is fed to delay element 156 in training circuitry 153. Element 156 imposes a delay of (K-1)T to the input sequence to synchronize the operations of various elements in circuitry 153. Modulo partial response filter 159 performs the grouping described above and processes the training sequence in groups according to the following expression:

$$s_i(n) = \sum_{m=0}^{\frac{N-\text{mod}6(N)}{6}} p_{\text{mod}6(n-i)+6m} TR(n - \text{mod}6[n-i] - 6m),$$

where i=0, 1, . . . , 5; mod 6 [*] denotes a standard modulo 6 operation on the argument "*". The output of filter 159, denoted vector S(n), is provided to level adapter 161, where $S^T(n) = [s_0(n) \ s_1(n) \ s_2(n) \ s_3(n) \ s_4(n) \ s_5(n)]$. Based on S(n) and another input e'(n) to be described, level adapter 161 provides weighting factors, denoted $h_i(n)$, to modulo signal adjuster 163, where i=0, 1, 2 . . . , 5. The manner in which $h_i(n)$'s are derived is fully described below. Using the received weighting factors and a delayed version of TR(n), modulo signal adjuster 163 computes an output q(n) according to the following expression:

$$q(n) = \text{sign}[TR(n)] \ (a_0' + h_{\text{mod } 6[n]}\delta), \quad [1]$$

where $a_0'=943$ units described before, $\delta = a_0 - a_0' = 32$ units, and $$\text{sign}[\tau] = \begin{cases} +1 & \tau > 0.0 \\ 0 & \tau = 0.0 \\ -1 & \tau < 0.0 \end{cases}.$$

The output q(n) is fed to controller 169, and more specifically to partial response filter 165 therein having the same tap coefficients as feedback filter 145. Filter 165 forms an output o(n) expressed as follows:

$$o(n) = P^T(n)Q(n),$$

where $Q^T(n) = [q(n-(K-1))\ q(n-(K-2))\ \ldots\ q(n-1)\ q(n)]$.

The output o(n) is provided to subtracter 167. The latter also receives a signal from feed-forward filter 143 through switch 146. This signal is derived by filter 143 from the data transmission by modem 105 based on the training sequence TR(n). Subtracter 167 subtracts the level of the signal by filter 143 from o(n) to form the aforementioned error signal e'(n). This error signal is applied through switch 146 to feed-forward filter 143 to adapt its filter coefficients in a conventional manner. As mentioned before, e'(n) is also applied to level adapter 161. Based on e'(n), and S(n) from modulo partial response filter 159, level adapter 161 updates the aforementioned weighting factors $h_i(n)$, i=0, 1, ... 5, as follows:

$$H(n) = H(n) - 2\beta e'(n) S(n), \qquad [2]$$

where $H^T(n) = [h_0(n)\ h_1(n)\ h_2(n)\ h_3(n)\ h_4(n)\ h_5(n)]$, and $\beta$ is the step-size of the update.

In order to stabilize feed-forward filter 143 in the beginning of TRN1A training, the weighting factors are not updated by level adapter 161 and are each set to be 0.5. After filter 143 is stabilized to a certain extent, level adapter 161 starts to update the weighting factors according to expression [2].

It can be shown that if a particular transmitted training data group i=I, $0 \leq I \leq 5$, is affected by the type A robbed bit signaling, the corresponding $h_I(n)$ from expression (2) would be close to zero. For other groups which are affected by the type B or no robbed bit signaling, the corresponding $h_i(n)$, $i \neq I$, would be close to 0.5. Thus based on, the above distinction of $h_i(n)$ values, adapter 161 effectively detects any transmitted data groups affected by the type A robbed bit signaling only. After group I is identified by adapter 161, the identity thereof (i.e., I) is communicated back to modem 105 using transmitter 190. The information concerning the group identity is received by receiver 109, which conveys the received information to transmitter 107. In operation, transmitter 107 avoids transmission of data using the LSB of each PCM word generated during the $n^{th}$ symbol interval, with mod 6 [n]=I corresponding to group I. It should be noted that group I here is not limited to only one group but generically represents one or more groups affected by the type A robbed bit signaling.

The detection of any data groups affected by the type B robbed bit signaling imposed by PSTN 120, and the mechanism whereby feed-forward filter 143 can be properly trained, taking into account the presence of any type A and/or type B robbed bit signaling, will now be described. To that end, expression [2] used by level adapter 161 above needs to be replaced by expressions [3a] and [3b} as follows:

$$H(n) = H(n) - 2\beta e(n) S(n) \text{ if } |TR(n)| = a_0 \text{ and mod } 6\ [n] \neq I;\text{ and} \qquad [3a]$$

$$H(n) = H(n) + 2\beta e(n) S(n) \text{ if } |TR(n)| = a_0' \text{ and mod } 6\ [n] \neq I. \qquad [3b]$$

In addition, expression [1] used by modulo signal adjuster 163 above needs to be replaced by expressions [4a], [4b] and [4c] as follows:

$$q(n) = \text{sign } [TR(n)]\ (a_0' + h_{\text{mod } 6\ [n]}\delta) \text{ if } |TR(n)| = a_0 \text{ and mod } 6\ [n] \neq I; \qquad [4a]$$

$$q(n) = \text{sign } [TR(n)]\ (a_0' + (1.0 - h_{\text{mod } 6\ [n]})\delta) \text{ if } |TR(n)| = a_0' \text{ and mod } 6\ [n] \neq I;\text{ and} \qquad [4b]$$

$$q(n) = \text{sign } [TR(n)]_{a_0'} \text{if mod } 6(n) = I. \qquad [4c]$$

It can be shown that if a particular transmitted training data group i=I', $0 \leq I' \leq 5$, is affected by the type B robbed bit signaling, the corresponding $h_{I'}(n)$ from expressions (3a) and (3b) would be close to 0.5. For other groups which are not affected by robbed bit signaling, the corresponding $h_i(n)$, $i \neq I'$, would be close to 1.0. Similarly, after group I' is identified by adapter 161, the identity thereof (i.e., I) is communicated back to modem 105 using transmitter 190. In operation, transmitter 107 avoids transmission of data using the LSB of each PCM word generated during the $n^{th}$ symbol interval, with mod 6 [n]=I' corresponding to group I'.

It should pointed out that by using expressions [4a], [4b] and [4c], adjuster 163 modifies the local TRN1A sequence, taking into account any detected type A and/or type B robbed bit signaling. The modified sequence which conforms to the received training sequence from PSTN 120 is used to properly train feed-forward filter 143 and thus DFE 140. For example, in expression [4c], where the type A robbed bit signaling is detected (i.e., mod 6 [n]=I), q(n) is always set to $a_0'$ corresponding to "4E." This stems from the earlier observation that regardless of whether "4E" or "4F" in the TRN1A sequence is communicated by modem 105, the data, when received, indiscriminately becomes "4E" due to the type A robbed bit signaling.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, communications arrangement 100 disclosed herein uses T1 facilities which are common in the United States. However, the invention is equally applicable in other countries such as European countries where E1 facilities instead of the T1 facilities are used, and where A-law companding instead of $\mu$-law companding controls.

Finally, communications arrangement 100 disclosed herein is in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. Apparatus for adjusting an adaptive component in a receiver for receiving from a first source information subject to corruption by robbed bit signaling, the apparatus comprising:

an adaptive processor for determining a plurality of weights for identifying robbed bit signaling affecting predetermined information provided from the first source to the receiver;

a second processor responsive to the weights for modifying the predetermined information from a second source; and a controller responsive to the modified predetermined information and an output of the adaptive component for generating a control signal to adjust the adaptive processor and the adaptive component.

2. The apparatus of claim 1 wherein the robbed bit signaling is identified based on relative values of the weights.

3. The apparatus of claim 1 wherein the adaptive component includes an equalizer.

4. The apparatus of claim 1 wherein the predetermined information includes training data.

5. The apparatus of claim 1 wherein the robbed bit signaling includes type A robbed bit signaling.

6. The apparatus of claim 1 wherein the robbed bit signaling includes type B robbed bit signaling.

7. The apparatus of claim 1 further comprising means for grouping the predetermined information from the second source according to periodicity of the robbed bit signaling.

8. A communications system comprising:
receiving circuitry for receiving from a first source first symbols representative of selected information, the received first symbols being assianed to a predetermined number of groups;
training circuity responsive to a signal from the receiving circuitry, and second symbols representative of the selected information from a second source for generating a sequence of weights, any group of received first symbols which is affected by robbed bit signaling being identified based on relative values of the weights; and
an output for providing data concerning an identity of the group affected by the robbed bit signaling to avoid a loss of information in transmission of other symbols from the first source which are associated with the group.

9. The system of claim 8 comprising a pulse code modulation (PCM) modem.

10. The system of claim 8 wherein each symbol includes a PCM word.

11. The system of claim 8 further comprising an adaptive component, wherein the selected information includes training data used to adjust the adaptive component.

12. The system of claim 11 wherein the adaptive component includes an equalizer.

13. The system of claim 8 includes a public switched telephone network (PSTN) generating the robbed bit signaling.

14. The system of claim 8 wherein the robbed bit signaling includes type A robbed bit signaling.

15. The system of claim 8 wherein the robbed bit signaling includes type B robbed bit signaling.

16. A method for adjusting an adaptive component in a receiver for receiving from a first source information subject to corruption by robbed bit signaling, the method comprising:

determining by using an adaptive processor a plurality of weights for identifying robbed bit signaling affecting predetermined information provided from the first source to the receiver;
modifying the predetermined information from a second source in response to the weights; and
generating a control signal to adjust the adaptive processor and the adaptive component in response to the modified predetermined information and an output of the adaptive component.

17. The method of claim 16 wherein the robbed bit signaling is identified based on relative values of the weights.

18. The method of claim 16 wherein the predetermined information includes training data.

19. The method of claim 16 wherein the robbed bit signaling includes type A robbed bit signaling.

20. The method of claim 16 wherein the robbed bit signaling includes type B robbed bit signaling.

21. The method of claim 16 further comprising grouping the predetermined information from the second source according to periodicity of the robbed bit signaling.

22. A method for use in a communications system including receiving circuitry, the method comprising:
receiving from a first source first symbols representative of selected information using the receiving circuitry, the received first symbols being assigned to a predetermined number of groups;
generating a sequence of weights in response to a signal from the receiving circuitry, and second symbols representative of the selected information from a second source, any group of received first symbols which is affected by robbed bit signaling being identified based on relative values of the weights; and
providing data concerning an identity of the group affected by the robbed bit signaling to avoid a loss of information in transmission of other symbols from the first source which are associated with the group.

23. The method of claim 22 wherein each symbol includes a PCM word.

24. The method of claim 22 wherein the system comprises an adaptive component, and the selected information includes training data used to adjust the adaptive component.

25. The method of claim 22 wherein the robbed bit signaling is generated in a PSTN.

26. The method of claim 22 wherein the robbed bit signaling includes type A robbed bit signaling.

27. The method of claim 22 wherein the robbed bit signaling includes type B robbed bit signaling.

* * * * *